March 8, 1960  
W. C. HOCH  
2,927,508  
MULTIPLEX CAMERA FOR PHOTOGRAPHING ADJACENT  
SCENES ON SEPARATE IMAGE RECORDING MEANS  
Filed Jan. 27, 1953  
3 Sheets-Sheet 1
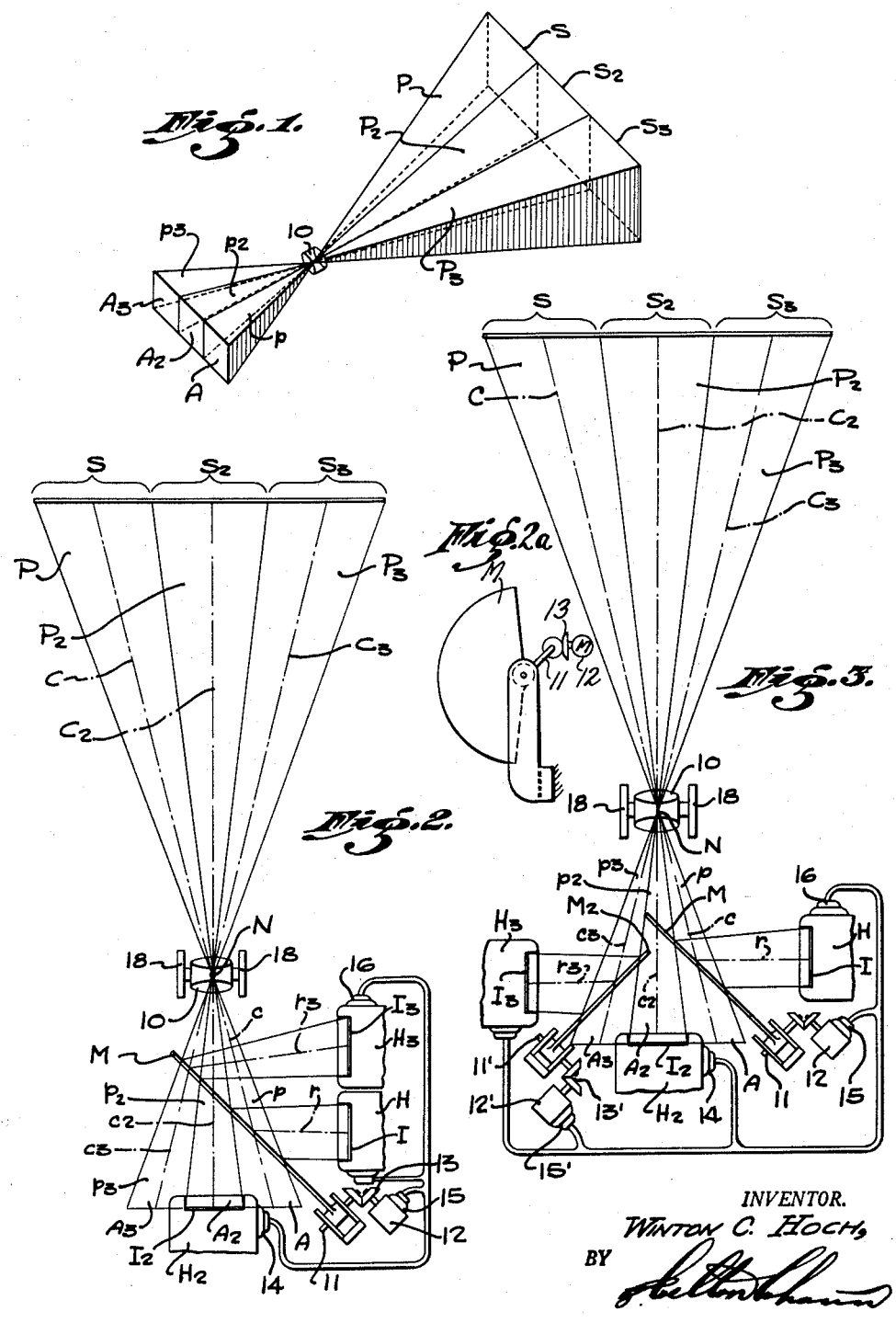
INVENTOR.  
WINTON C. HOCH,  
BY  
ATTORNEY

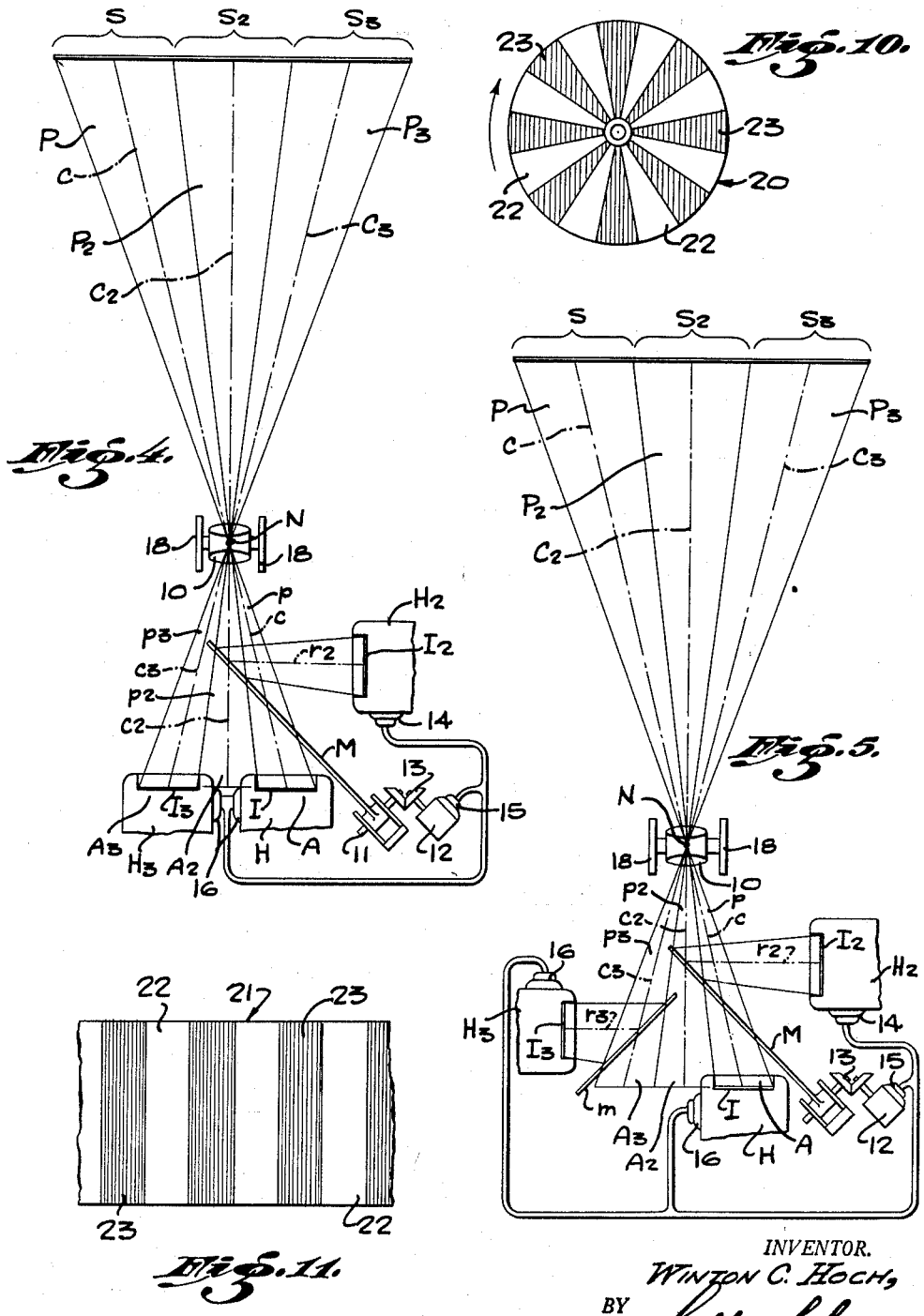

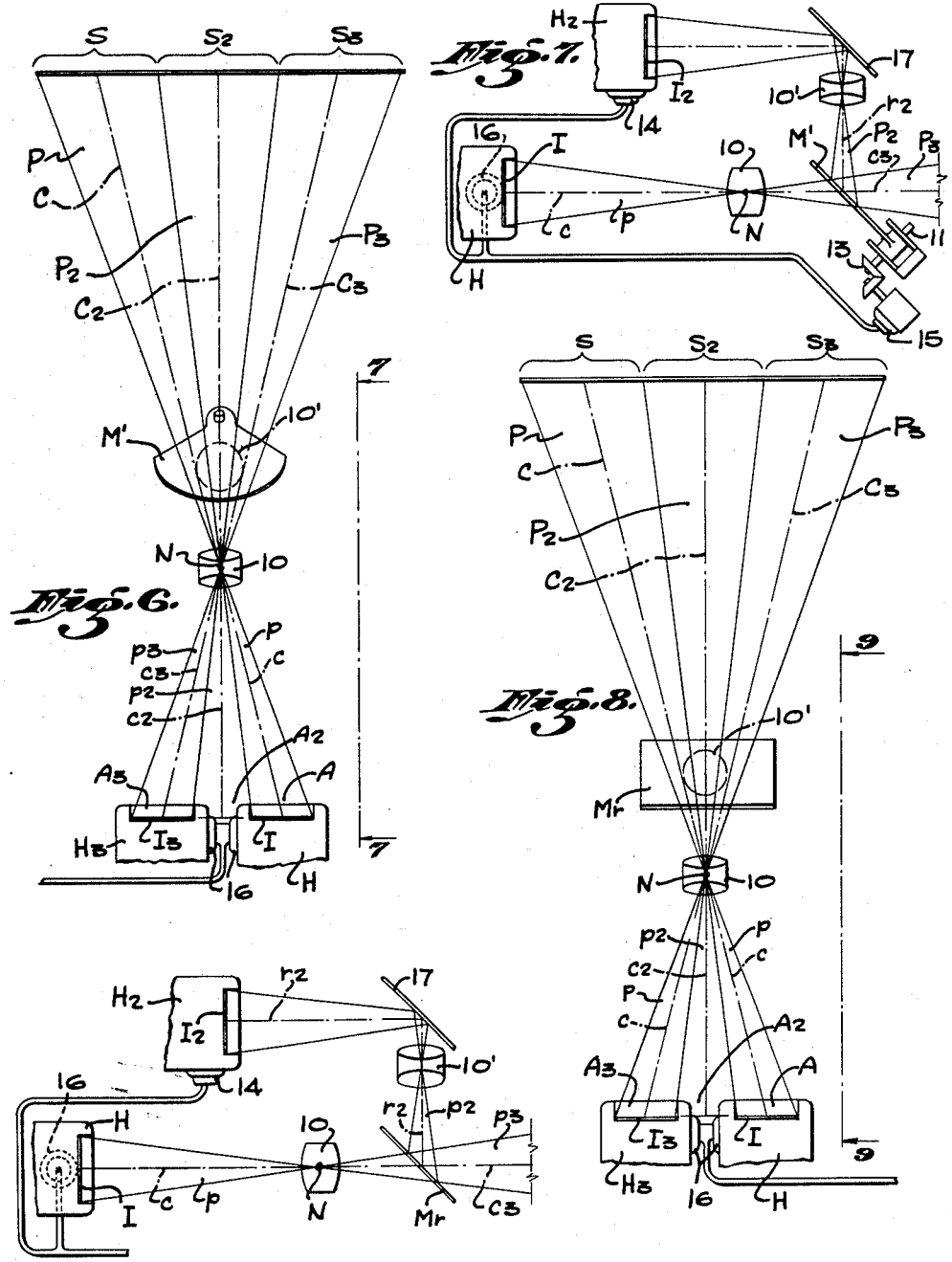

United States Patent Office 2,927,508
Patented Mar. 8, 1960

2,927,508

MULTIPLEX CAMERA FOR PHOTOGRAPHING ADJACENT SCENES ON SEPARATE IMAGE RECORDING MEANS

Winton C. Hoch, Los Angeles, Calif., assignor, by mesne assignments, to Cinerama, Inc., New York, N.Y., a corporation of New York Application January 27, 1953, Serial No. 333,438

4 Claims. (Cl. 88—16.6)

My invention relates in general to a method and means for producing on a screen or screens a large picture which includes, in side-by-side relation, images which have been separately photographed, and relates in particular to a multiplex camera for photographing adjacent scenes which are to be subsequently combined in a single large picture, in a manner to avoid the serious faults arising from parallax, unequal magnification and blending of images, etc. This application is related to my copending application, Serial No. 333,436, filed January 27, 1953, for Method and Means for Producing a Picture Comprising a Plurality of Adjacent Images.

It is an object of the present invention to photograph separate scenes through a single lens and by use of separate image recording areas or means, and to correct conditions of image distortion, image magnification and image loss in the blend areas of the recorder image such as may be caused by parallax.

It is an object of the invention to provide a multiplex camera having optical means, including a single lens which defines front and rear pyramids disposed in adjacent relation and having their axes crossing substantially on the front nodal point of the lens. The front pyramids have the adjacent scenes to be photographed at their bases, and such pyramids are of the same altitude.

A further object of the invention is to provide reflecting means disposed in crossing relation to the axis of at least one of the optically defined pyramids, for reflecting light from one of the adjacent scenes to image recording means arranged at a side of the optical axis of the lens.

It is a further object of the invention to provide a multiplex camera having image recording means disposed directly behind the lens for recording the light image from one of the scenes, and having reflector means for reflecting light which has passed through the lens to image recording means disposed to the side, so as to record the image of at least one other of the scenes.

In one form of the invention the reflecting means comprises a partially reflecting mirror, and in another form of the invention the reflecting means is a movable totally reflecting mirror having means for moving it into and out of reflecting position in timed relation to the alternate operation of the rear and side image recording means. In one form of the invention motion picture film is employed as an image recording means, and such film is moved and positioned by film holding and advancing mechanisms such as well known in the art. In its broader sense, the term image recording means includes any means, whether for still picture, motion pictures or television employed in the camera to record the images of the scenes formed by the lens means.

Further objects and advantages of the invention may be brought out in the following part of the specification wherein the description of the invention is presented in detail for the purpose of making a complete disclosure without, however, limiting the scope of the invention which is set forth in the appended claims or restricting the range of equivalence to which the claims may be entitled.

Referring to the drawings which are for illustrative purposes only and wherein like numbers indicate similar parts;

Fig. 1 is a perspective view showing optical means arranged to define adjacent imaginary pyramids having rectangular bases;

Fig. 2 is a schematic plan view of a preferred form of the invention;

Fig. 2a is a diagramatic elevation of the reflector shown in Fig. 2;

Fig. 3 is a schematic view, in general similar to claim 1, showing the form of my invention wherein images of scenes are reflected in different directions from the optical axis of the lens;

Fig. 4 is a similar schematic view showing a form of the invention wherein the image of the central scene is reflected laterally;

Fig. 5 is a schematic view showing a form of the invention wherein the central image and one of the side images are reflected laterally;

Fig. 6 is a schematic view showing the form of the invention wherein the light from one of the scenes is reflected laterally by reflecting means placed ahead of the principal lens means;

Fig. 7 is an elevational view taken substantially as indicated by the line 6—6 of Fig. 6;

Fig. 8 is a schematic plan view similar to Fig. 6 disclosing the placement of a partially reflecting mirror ahead of the principal lens of the system;

Fig. 9 is an elevation view taken as indicated by the line 8—8 of Fig. 8;

Fig. 10 is a schematic plan view showing a form of light dividing mirror of rotary type which may be employed in the practice of the invention;

Fig. 11 is a schematic view of a reciprocating type of light dividing mirror which may be employed in the practice of the invention.

In Figs. 1 and 2, I show a lens 10 arranged to receive light from three adjacent scenes S, S2 and S3. Light is reflected from these scenes through the lens 10 to three focal plane areas A, A2 and A3. For the purpose of explanation it will be stated that the lens 10 defines three side-by-side pyramids P, P2 and P3 and also three rear pyramids p, p2 and p3, the front pyramids having the scenes S, S2, S3 at their bases and the rear pyramids having the rectangular focal plane areas A, A2 and A3 at their bases. In Fig. 1 the scenes S, S2 and S3 are shown as rectangular areas, but it will be understood that these scenes may constitute objects to be photographed which objects are disposed in the planes of the rectangles, in front of the same or behind the same.

As shown in Fig. 2 the pyramids P, P2 and P3 respectively have axes or center lines C, C2 and C3 which extend from the centers of the scenes S, S2 and S3 to the nodal point N of the lens 10. The continuations $c$, $c2$ and $c3$ of the axes C, C2 and C3 form the axes of the rear pyramids $p$, $p2$ and $p3$. The axes $c$, $c2$ and $c3$ extend from the point N to centers of the bases of the pyramids $p$, $p2$ and $p3$. Separate light recording means placed in the areas A, A2 and A3 will receive light value images of the scenes S, S2 and S3.

In the form of the invention shown in Fig. 2 a light recording means 12 is disposed directly behind the lens 10 at the base of the middle pyramid $p2$ to receive the image of the scene S2. This light recording means is carried in a suitable holder mechanism H2. In a side position an axle member 11 is arranged to rotatably support a mirror M. The mirror M is substantially semi-circular or in the form of a half-disc, and it is positioned so that upon rotation of the shaft by a drive mechanism 12 and gear means 13 it will be alternately rotated into and out of the position in which it is shown in full lines, crossing the pyramids p, p2 and p3, so as to reflect laterally light which moves rearwardly from the lens 10 along the axes c, c2 and c3 of the rear pyramids. Holders H and H3 are disposed so as to support image recording means I and I3 in positions to receive light value images of the scenes S and S3 reflected by the lower and upper portions of the mirror along the reflected axes r and r3 of the pyramids c and c3. The light recording means I, I2 and I3 may be of any character. In one practice of the invention these light recording means I, I2 and I3 are motion picture film and the holders H, H2 and H3 are film handling mechanisms such as employed in motion picture cameras to intermittently advance sensitized film strips. Interlocked motors 14, 15 and 16 are employed to actuate the mechanisms H, H2 and H3 in suitably timed relation. That is to say, when the mechanism 12 positions the mirror M in a reflecting position such as shown in full lines in Fig. 2, the mechanisms H and H3, driven by the motor 16 will expose the image recording means I and I3. At this time the mechanism H2 will advance the recording means I2 so as to bring an adjacent frame into focal position, and when the mechanism 12 has moved the mirror out of reflecting position so that light may pass back along the axis c2 of the central pyramid p2, the mechanism H2 operated by the motor 14, will expose the light recording means I2 to the image of the scene S2.

Fig. 3 shows a form of the invention wherein the holding mechanism H2 is directly behind the lens 10, but the holding mechanisms H and H3 are arranged on opposite sides of the rear pyramids p, p2 and p3 instead of being both at one side as shown in Fig. 2. The mirror M reflects only the light value image of the scene S to the image recording means I carried by the holding mechanism H. A second mirror M2, supported on a shaft 11′ and arranged to be driven by a mechanism 12′ and gears 13′, is arranged to be alternately moved into and out of a position crossing the axis c3 of the pyramid p3. Also, in this form of the invention it is necessary to provide an additional interlocked motor 15′ to drive the mechanism 12′ synchronously with the driving of the mechanism 12, so that during the transmission of an image of the scene S2 to the light recording means I2 both of the mirrors M and M2 will be removed from the reflecting positions in which they are shown in full lines in Fig. 3, the holding mechanism H2 at this time functioning to expose the image recording means I2, and the holding mechanisms H and H3 respectively simultaneously operating to perform such adjustment of the image recording means I and I3 as may be required.

In the forms of the invention shown in Figs. 2 and 3 the images of the side scenes S and S3 have been reflected laterally and the image of the central scene S2 has been passed directly from the lens N to the image recording means I2, without reflection. In the form of the invention shown in Fig. 4 the image of the central scene S2 is reflected laterally to one side and the holding mechanism H2 is disposed at a side so as to support image recording means I2 in a position to receive the light value image which the mirror N reflects laterally along the reflected axis r2 of the central pyramid p2. In this form of the invention the holders H and H3 are arranged to support the image recording means I and I3 at the bases of the pyramids p and p3 so that they will receive the light value images of the scenes S and S3 which are projected rearwardly by the lens 10 along the axes c and c3. Operated by the motor 14, the mechanism H2 will effect response of the image recording means I2 when the mirror M is in the reflecting position in which it is shown in Fig. 4. The motors 16 will effect simultaneous operation of the mechanisms H and H3 in alternate relation to the operation of the mechanism H2 so that the mechanisms H and H3 will effect exposure of the image receiving means I and I3 to the images of the scenes S and S3 when the mechanism 12, operated by the interlocked motor 15 has moved the mirror M into nonreflecting position.

The form of the invention shown in Fig. 5 is arranged to laterally reflect one side image and the central image, the remaining side image being passed from the lens directly to a light recording means without reflection. In a manner shown in Fig. 4, the form of the invention disclosed in Fig. 5 employs the mirror M to reflect the central image rightwardly to the image recording means I2 which is carried by the holding mechanism H2 driven by the interlocked motor 14, and the holding mechanism H is arranged to support the image recording means I in a position to receive the light value image of the scene S, when the mirror M is moved into non-reflecting position. A mirror m is arranged in a position crossing the axis c3 of the pyramid p3 so as to reflect the image of the scene S3 to the image recording means I3 which is supported by the holding mechanism H3 leftwardly of the pyramid p3. The interlocked motor 16 drives the mechanisms H and H3 in alternate relation to the driving of the mechanism H2 by the motor 14, and in alternate relation to the movement of the mirror into and out of reflecting position by the mechanism 12. The mirror m is fixed in a position crossing the pyramid p3 and the marginal portions of the mirror m are extended sufficiently to pick up substantially all of the light from the lens 10 which is passing along the axis c3 of the pyramid p3. The extension of the marginal portions of the mirrors M and M2 as shown in the drawings is for the purpose of reflecting all of the light comprising the respective reflected images.

In the form of the invention shown in Figs. 6 and 7 the holding mechanisms H and H3 are arranged as described with relation to Fig. 4 so as to support the image recording means I and I3 respectively in positions to receive the images of the scenes S and S3. However, in this form of the invention a reflector M′ is arranged so that it will operate ahead of the lens 10 to reflect light from the central scene S2 laterally, thereby making it possible to pass the light from the image S2 through a lens 10′, matched with the lens 10, to the light recording means I2 supported by the holding mechanism H2. As shown in Fig. 7 a reflecting means 17 is positioned so as to reflect light which is passed through the lens 10′ to the image receiving means I2. The reflector M′ is of a type adapted to be intermittently moved into position to reflect light from the screen S2 to the lens 10′. The reflector M′ is shown as a rotatable mirror arranged to be rotated into a position crossing the pyramid P2 in alternate relation to the operation of the mechanisms H and H3 to expose the image recording means I and I3.

The invention comprehends that partially reflecting mirrors may be employed instead of rotating or reciprocating full reflecting mirrors. For example, the mirror M shown in Fig. 2 may be a stationary partial mirror so that it will pass light to the image recording means I2 and will reflect light to the image recording means I and I3. Also, the form of the invention shown in Figs 8 and 9 employs a partial mirror Mr ahead of the lens 10 in a system which is otherwise substantially identical to the system shown in Figs. 6 and 7. This mirror Mr is of such a size that it extends across all of the pyramids P, P2 and P3, with the margins thereof projecting. In Fig. 2 I have shown the lens 10 mounted in guides 18 for the purpose of adjusting movement of the lens 10 along its optical axis, to enable focusing of the camera on scenes or objects disposed at different distances from the camera. The holding mechanisms H, H2 and H3, after their original adjustment, are maintained in fixed positions and focusing is accomplished by movement of the lens 10 in the forms of the invention shown in Figs. 2 to 5 inclusive. In the forms of the invention shown in Figs. 6 to 9, however, focusing is accomplished by simultaneous movement of the lenses 10 and 10'.

The partial mirrors used in the practice of the invention may consist of the rotary mirror 20 shown in Fig. 10 or the reciprocating mirror 21 shown in Fig. 11. Each of these mirrors 20 and 21 has alternate clear and reflecting areas 22 and 23. When the mirror 20 is rotated in a position crossing the light path of any of the forms of the invention disclosed in the foregoing, half of the light will be passed on through the clear portions 22 and the remaining half of the light will be reflected. The mirror 21 shown in Fig. 11 is arranged to be disposed across the light path, for example in the position of the mirror Mr of Fig. 8, and reciprocated in such position so that substantially half of the light will pass through the clear portions 22 and the remainder of the light will be reflected by the portions 23 in the direction of the lens 10', so that the lens 10' will pick up the image of the scene S2.

I claim:

1. Apparatus for photographing contiguous portions of a scene including moving images of objects in the scene for subsequent projection as parts of a moving mosaic picture, said apparatus comprising a single lens that images the entire field of the scene, a reflector extending into the light beam of the lens in position to reflect the part of the light that has passed through the lens from one portion of the scene, a first image recording means at a locaiton outside of the cone defined by the direct light beam from the lens and in position to receive the light from the reflector and from only a portion of the scene and up to a predetermined line of the scene, said first image recording means being at the focal plane of the lens along the reflected portion of the light beam, a second image recording means in angular relation to the first image recording means and in position to receive light that has passed through the lens from another portion and only a portion of the scene including light over to said predetermined line whereby contiguous portions of the scene are recorded without a gap between them, the second image recording means being at the focal plane of the lens along the part of the light beam from said other portion of the scene.

2. The apparatus described in claim 1 and in which the reflector is supported by bearing means on which it is movable into and out of the light beam.

3. The apparatus described in claim 2 and in which the image recording means are motion picture cameras and there are motor means for moving the reflector into and out of the light beam in timed relation with the operation of the motion picture cameras.

4. The apparatus described in claim 2 and in which the reflector extends across the full width of the light beam but reflects only a part of the width of the light beam to one image recording means, and the reflector leaves the other part of the light beam unobstructed for passage to the other image recording means when the reflector moves out of the light beam.

References Cited in the file of this patent

UNITED STATES PATENTS

| | | |
|---|---|---|
| 540,545 | Gray | June 4, 1895 |
| 1,003,300 | Schwab | Sept. 12, 1911 |
| 1,136,236 | Killman | Apr. 20, 1915 |
| 1,416,645 | Jones | May 16, 1922 |
| 1,424,886 | Douglass | Aug. 8, 1922 |
| 1,906,509 | Aschenbrenner | May 2, 1933 |
| 1,924,901 | Ball | Aug. 29, 1933 |

FOREIGN PATENTS

| | | |
|---|---|---|
| 678,921 | France | Apr. 7, 1930 |
| 923,567 | France | July 10, 1947 |
| 337,214 | Italy | Feb. 28, 1936 |